(12) United States Patent
Roussel et al.

(10) Patent No.: US 6,632,466 B2
(45) Date of Patent: Oct. 14, 2003

(54) COEXTRUSION METHOD WITH COEXTRUSION HOLLOW NEEDLES

(75) Inventors: Herve Roussel, Saint Arnoult en Yvelines (FR); Daniel Genton, Guyancourt (FR)

(73) Assignee: Bongrain SA, Viroflay (FR)

( * ) Notice: Subject to any disclaimer, the term of this patent is extended or adjusted under 35 U.S.C. 154(b) by 0 days.

(21) Appl. No.: 09/755,472

(22) Filed: Jan. 5, 2001

(65) Prior Publication Data

US 2001/0019732 A1 Sep. 6, 2001

(30) Foreign Application Priority Data

Jan. 7, 2000 (FR) .............................. 00 00186

(51) Int. Cl.⁷ ................................. A23P 1/00
(52) U.S. Cl. ...................... 426/516; 426/284
(58) Field of Search ................. 426/516, 282, 426/284; 425/133.1

(56) References Cited

U.S. PATENT DOCUMENTS 4,309,450 A * 1/1982 Seibert ...................... 426/516
4,888,192 A * 12/1989 Ramnarine ................. 426/516

FOREIGN PATENT DOCUMENTS

EP          0260194        3/1988

OTHER PUBLICATIONS

English Abstract of European Patent No. EP 0260194.

* cited by examiner

Primary Examiner—George C. Yeung
(74) Attorney, Agent, or Firm—Harness, Dickey & Pierce, P.L.C.

(57) ABSTRACT

A method for producing a food product including a solid casing coating at least one stuffing in a coextrusion device including a coextrusion die fed with a proteic base and a stuffing material. The method including forming in a first section of the die the casing which solidifies via a thermic effect. The first section being longitudinally traversed by at least one hollow needle for transferring the stuffing, one hollow needle per stuffing material, and penetrating into a second section of the die. Stuffing the second section of the die including the solid casing formed in the first section of the die with the stuffing material coming out of the hollow needle traversing the first section. Recovering the product, including the external casing filled with the stuffing material, at the outlet of the die.

35 Claims, 5 Drawing Sheets

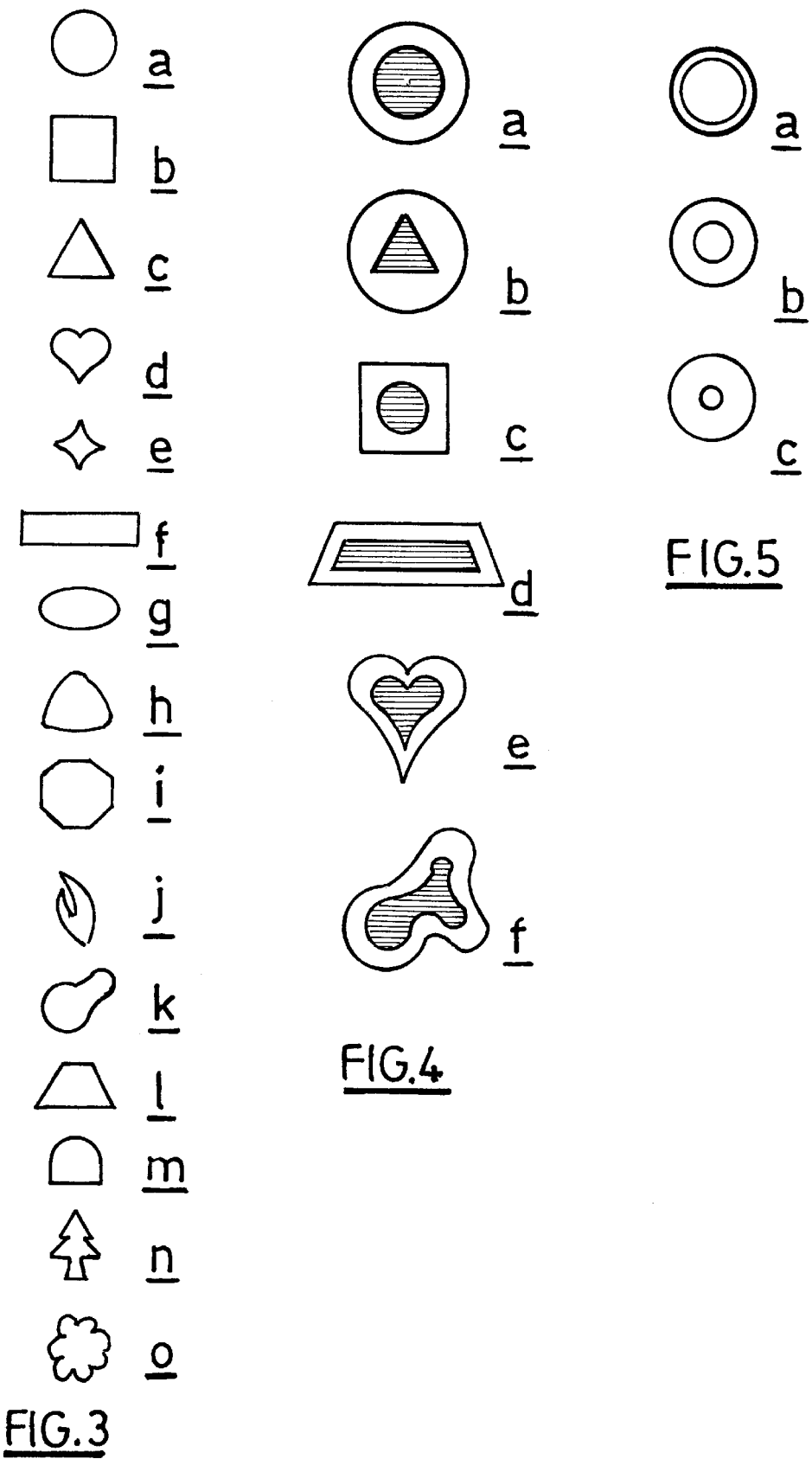

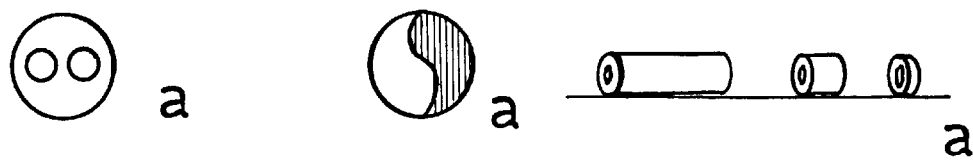
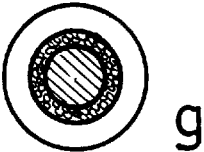
FIG.6
FIG.7
FIG.8

COEXTRUSION METHOD WITH COEXTRUSION HOLLOW NEEDLES

The invention concerns a standard stuffed food speciality product, a method for producing this product, and a device implementing this method.

There already exist food co-extrusion methods, as well as single extrusion systems, food or non-food being almost similar to co-extrusion via their design.

There is for example a system used in particular in the confectioner trade Known by an expert in this field under the name "RHEON" including an integrated device made up of Two wing pumps and their hoppers meeting together at the level of a standard coextrusion head. The casing of the product is formed at the same time as the stuffing in an extremely short die (2 to 3 cm). No cooking is possible in the device which supports excessively hot raw material with difficulty, typically above 60° C. This system is complex to mount and dismantle involving at least thirty mechanical elements and is extremely difficult to clean when cheese is used. This system is in particular used to coextrude large shapes, stuffed balls, stuffed rolls, large diameter sticks (minimum diameter 20 mm) or gnocchi.

With cheese in particular, small cheese sticks with a diameter of between 10 and 15 mm, indeed less, cannot be made without significantly modifying the device. The cost and low capacity of the machine are negative elements for economically producing small items, such as sticks or similar stuffed cheese moulds.

There is also a method similar to the preceding one commonly known as "VEMAG", the difference being that the device is not integrated in a given device. In fact, it concerns two thrustors conjugated with a coextrusion head. This head is extremely short and generally remains with a diameter of more than 20 mm so as to obtain a product at reasonable production costs.

In all these cases, the cost of the system would be prohibitive for small items, such as food sticks, especially stuffed or cheese sticks.

There is also an injection filling method. In fact, there are products which combine brioche type coextruded products which are stuffed after cooking using an injection needle. This system does not in general applies to cheeses.

There are also stuffed type products which may resemble coextruded products. For example, by starting with a product rolled from a strip 2 to 3 mm thick with a width of 10 cm, this product is obtained by placing a stuffing at the centre of the strip before rolling. This is the case for example with bread containing chocolate. This method could be applied to cheese under certain formulation conditions: in particular the glueing and joinability properties of the cheese pastry. The product yield is extremely different from a stuffed cheese specialty to be described subsequently.

There are also co-pushing systems or other thrustor systems for co-pushing sausages. The result appears for example in the form of sausages with a cheese heart.

It is difficult to have the system adapt to high dry extract cheeses described in the remainder of the text.

The invention seeks to obtain stuffed food specialities, especially cheese ones, which are typically small with a lower diameter of less than 20 mm and in particular between 10 and 15 mm, thus mitigating the drawbacks of the prior art so as to obtain this type of product.

The invention also seeks to obtain these products by using cheese pastries having a high dry extract reaching of between 50 and 60%. With the coextrusion systems of the prior art, the shearing forces in the coextrusion die are too high to obtain a good product yield.

The invention also seeks to use a possible wide variety of formulations for the production of the desired products.

According to a first characteristic, the invention concerns a method for producing a food product including a solid casing coating at least one stuffing from a food bass used to form the casing of the product and at least a food stuffing material in a coextrusion device including a coextrusion die fed with the food base and the stuffing material(s), the method including the following successive stages:

formation in a first section of the die of the casing which solidifies via a thermic effect, this first section being longitudinally traversed by at least one transfer hollow needle of the stuffing, one hollow needle per stuffing material penetrating into a second section of the die, the start of the second section being defined by the outgoing extremity of the shorter hollow needle;

a stuffing in the second section of the die of the solid casing formed in the first section of the die with the stuffing material(s) coming out of the hollow needles traversing the first section;

recovery of the product including the external casing filled with the stuffing material(s) at the die outlet.

The food base is typically proteinic and can be a polysaccharide.

According to a first embodiment, the casing is formed in the first section of the die by cooling, normally via the circulation of water or another similar fluid.

According to one variant, natural cheeses, fresh curds or non-molten cheese specialities are used for the casing material.

According to another variant, molten cheeses or molten cheese specialities with or without melting salts are used for the casing material.

According to one embodiment, the method includes the following stages:

preparation of the stuffing and casing at a temperature of about 90° C. in the feed hoppers;

cooling at a temperature close to 80° C. of the stuffing and cooling at a temperature of about 60° C. of the casing between the feed hoppers and the coextrusion head;

extrusion of the casing with cooling of the first section of the die at a temperature of about 50° C. so as to solidify the casing;

extrusion of the stuffing which fills the casing produced in the first section with cooling of the second section of the die at a temperature of about 30° C., the product coming out of the die having a temperature of about 38° C.

The following are defined:

TE=temperature of the casing in the feed hopper of the system

TFn=temperature of the stuffing n in its feed hopper

TFIL 1=average temperature of the wall of the die corresponding to the length

L1

TFILn=average temperature of the wall of the die corresponding to the length

Ln–(L n–1)

TP1=average temperature of the product at the outlet of the hollow needle 1

TPn=average temperature of the product at the outlet of the hollow needle n

TFILFIN=average temperature of the wall of the die corresponding to the length L–Ln TPFIN=average temperature of the product at the outlet of the die.

According to one embodiment, the temperatures in the coextrusion device follow the law:

$$TE=TFn=TFIL1=TFILn=TFLFIN=TP1=TPn=TPFIN=2-10° C.$$

According to another embodiment, for a "hot" process, with the casing and the stuffing(s) being introduced between 30 and 80° C., the temperatures in the coextrusion device follow the law:

$$TE=TFn=30-80° C.; 80° C.>TFIL\ 1>TFIL\ n>TFILFIN=30° C.;$$
$$TP1=TPn=TPFIN=70\ at\ 35° C.$$

According to another embodiment, in a "high temperature" process, with the casing and the stuffing(s) being introduced between 90 and 100° C., the temperatures in the coextrusion device follow the law:

$$TE=TFn=90-100° C.:\ 80° C.>TFIL\ 1>TFILn>TFILFIN=30° C.;$$
$$TP1=TPn=TPFIN=85\ at\ 35° C.$$

According to a second embodiment, the envelope is formed by heating, by thermic coagulation at a temperature of more than 50° C. and normally between 80 and 100° C.

In this embodiment, it is possible to use products for the casing material which are meat, egg, fish flesh or surimi composites.

According to one embodiment, the coextrusion device follows the law:

$$TE=Tfn=2-50° C.;\ TFIL\ 1=TFILn=TFILFIN>80-100° C.;\ TP$$
$$1=TPn=TPFIN=60-80° C.\ thoroughly\ hot.$$

According to another embodiment, the method includes the following stages:
- a preparation of the stuffing at a temperature TFn close to 90° C. and of the casing at a temperature TE close to 7° C. in the feed hoppers;
- cooling between the feed hoppers and the coextrusion head at a temperature of close to 75° C. for the stuffing, and at a temperature of about 4° C. for the casing;
- reheating to temperature TFIL 1 close to 45° C. of the first section of the die so as to reduce the casing to a fluid state;
- cooling to a temperature TFILFIN close to 25° C. of the second section of the die, the stuffing being introduced into the casing at a temperature of about 50° C., the product at the die outlet having a temperature TP FIN of about 28° C.

According to one embodiment, the method includes the following stages:
- preparation of the stuffing and casing at a temperature of about 40° C.;
- keeping the stuffing cold at a temperature of about 40° C. as far as the coextrusion head and at the same time reheating of the casing to a temperature of about 50° C. between the feed hopper and the coextrusion head;
- heating of the first section of the die to a temperature TFIL 1 close to 98° C. so as to solidify the casing by means of thermic coagulation;
- heating of the second section of the die, the stuffing being introduced into the casing at a temperature TP1 close to 50° C.;
- the product coming out of the extrusion die having a temperature of about 80° C.

In the first and second embodiments for the stuffing material, composite products are normally used having a cheese, meat, egg, fish flesh, surimi, fruit or vegetable base.

Moreover, the casing material has a dry extract able to reach 60% and is typically between about 30 and 50%.

According to the method, the coextrusion head is fed by two single pumps with supercharging hoppers for the stuffing material and casing material respectively.

According to one embodiment, the transfer pumps of the hoppers are connected towards the coextruding machine directly on the coextrusion system.

According to another embodiment, the pumps are connected onto a closed intermediate system fitted with a heat exchanger so as to control the temperature of these materials immediately before they enter the coextrusion head.

According to one embodiment, the pressure and distribution of the material flow intended to form the casing are adjusted with the aid of a distribution plate inserted on the channel of the casing of the product.

According to one embodiment, several coextruded segments are assembled, possibly with a gelatinizing agent, and are then treated thermically so as to obtain a restored sliceable block.

Normally, the product at the die outlet is sliced and then conditioned continuously or discontinuously.

The linear flow speed of the product at the die outlet is typically between 5 and 10 metres/minute.

According to a second characteristic, the invention concerns a coextrusion device implementing the previously described method, the device including:
- means for feeding the casing material of the product;
- means for feeding the stuffing material of the product;
- a coextrusion chamber with a coextrusion head prolonged by a coextrusion die;
- first means for transferring the casing material into the coextrusion chamber;
- second means for transferring the stuffing material to the coextrusion head without mixing the stuffing material and casing material;
- the longitudinal coextrusion die including:
- a first die section in which the stage occurs for shaping the solid casing, this first section being traversed by at least one hollow needle, the end of the first section being defined by the outgoing extremity of the shortest hollow needle, each hollow needle transferring a stuffing material, the material of the casing coming out of the coextrusion head being transferred between the internal wall of the die and the external wall of the hollow needle(s);
- a second section from the outlet of the hollow needle or needles up to the outlet of the die in which the stuffing coming out of the hollow needle is coated by the solid casing.

The hollow needles are concentric, the most peripheral one being the shortest, or non-concentric.

The length L1 of the shortest hollow needle is at least 10 cm so that the casing solidifies and normally between 30 and 150 cm, the difference between the length L of the die and the length Ln of the longest hollow needle being at least 10 cm and typically between 30 and 600 cm.

The device includes means for regulating the temperature of the first transfer means, means for regulating the temperature of the second transfer means, means for regulating the temperature of the first section of the die, and means for regulating the temperature of the second section of the die.

The die typically has a circular, parallelepiped or ludic section.

The cross section of the die is identical to or different from that of the hollow needle(s). The diameter of the cross section of the die is between 5 and 50 mm and preferably between 7 and 20 mm. Normally, the section of the die is between 1.2 and is 5 times the section of the hollow needle.

According to a third characteristic, the invention concerns a food product of the stuffed food speciality type obtained by implementing the method described previously, the product including a solid casing extending longitudinally and coating at least one stuffing, the dimension of the cross section of the product being less than 20 mm and normally between 10 and 20 mm.

Its cross section is parallelepiped, rounded or ludic.

After slicing, its length is normally between one and ten times the width of its cross section.

The stuffing may have a cheese or non-cheese composition selected from the group including butcher pastries, fish-based pastries or other sea products, fruit, herbs, spices and flavours.

According to one embodiment, the product includes at least three concentric layers, the external casing having a cheese composition;

According to the invention, the product includes a solid casing with a cheese composition extending longitudinally coating at least one stuffing, the product having a cross section with a dimension of less than 20 mm and typically between 10 and 20 mm, and the casing has a dry extract of between 40 and 60%, the product thus being able to be picked up without sticking.

The food product appears in one variant in the form of a sliceable restored block obtained by assembling several products as described previously, this restored product comprising a plurality of stuffing lining channels.

Other objects and advantages of the invention shall appear on a reading of the following description with reference to the accompanying figures on which:

FIGS. 3a to 3o represent several non-restrictive embodiment variants of the general shape of food products conforming to the invention shown as a cross section, the stuffing material not being shown;

FIGS. 4a to 4f show several non-restrictive embodiment variants of food products conforming to the invention shown as cross sections, the internal stuffing material and the material of the external casing being shown respectively light and dark, the die including a stuffing hollow needle, by varying the shape of the die and the hollow needle;

FIGS. 5a to 5c represent several non-restrictive embodiment variants of food products conforming to the invention shown as cross sections obtained with different stuffing hollow needles for a given die, the hollow needles being centred;

FIGS. 6a to 6g represent several non-restrictive embodiment variants of food products conforming to the invention shown as cross sections, the die including several hollow needles;

FIGS. 7a to 7c represent several non-restrictive embodiment variants of food products conforming to the invention shown as cross sections obtained with different stuffing hollow needles for a given die, the hollow needles being off-centre;

FIGS. 8a to 8e represent several non-restrictive embodiment variants of food products conforming to the invention illustrating various possibilities for slicing or squeezing the products.

Figure 1:
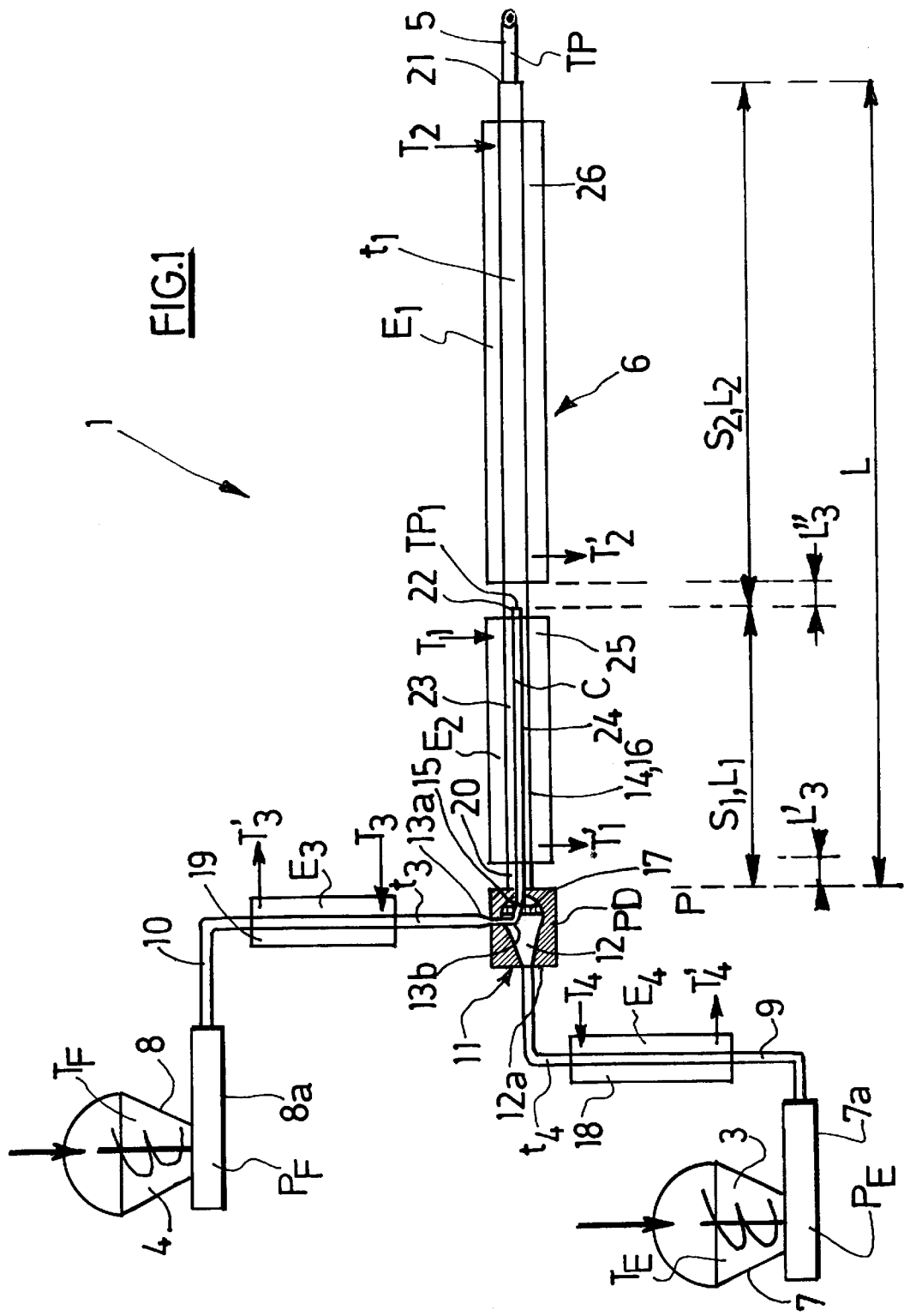
FIG. 1 is a diagrammatic view of the coextrusion device according to one embodiment of the invention using a die including one stuffing hollow needle.

Table 1 represents the operating temperatures at various areas of the coextrusion device of the invention according to a hot coextrusion type embodiment and according to two cold coextrusion type embodiments.

A first embodiment of the invention is described below:

A coextrusion device 1 is used to produce from a casing material 3 and a stuffing material 4 a coextruded product 5 by means of coextrusion in a coextrusion die 6.

The casing material 3 is introduced into a feed hopper 7 with a volume of typically about 50 liters. The stuffing material 4 is introduced into a feed hopper 8 having a similar volume.

The casing material is a cheese protein based product.

The hoppers 7 and 8 include means for apportioning the quantity at the outlet of these hoppers, and means for regulating the temperature of the casing material and the stuffing material. The hoppers 7 and 8 respectively project into the food tanks 7a, 8a.

The casing material 3 is directed by first transfer means 9 at the outlet of the tank 7a towards a coextrusion head 11. Similarly, the stuffing material 4 is directed by second transfer means 10 towards the coextrusion head 11. The first and second transfer means 9, 10 are food usage pipes. The flowrate in these pipes is between approximately 50 and 100 Kg/hr.

The coextrusion head 11 includes a coextrusion chamber 12.

The transfer means 9 of the casing material project into the chamber 12 via an inlet zone 12a.

The transfer means 10 of the stuffing project into an inlet 13 of the coextrusion head.

The external portion 13a of the transfer means 10 is in sealed communication with the external portion 13b of a hollow needle 14.

This hollow needle 14 includes:
a first portion 15 situated inside the chamber 12 of the head 11
a second portion 16 outside the head 11 and thus inside the die 6.

The hollow needle 14 is supported with the aid of support means 17 in the head 11.

The device 1 includes means 18 between the hopper 7 and the head 11 on one transfer pipe portion 9 for regulating the temperature of the casing material.

The device 1 also includes means 19 for regulating the temperature of the stuffing material between the hopper 8 and the head 11.

There now follows a more specific description of the die 6 and production of the coextruded product 5.

The die 6 has a first extremity 20 at the outlet of the coextrusion head 11 and a second extremity 21 where the coextruded product opens into.

The die 6 successively includes a first section S1 with a length L1, a second section S2 with a length L2. The length L1 is the length of the die 6 from the plane P of the extremity 20.

This length L1 is the length of the die 6 which includes the portion of the hollow needle 14 situated inside the die 6. Over this length L1, the stuffing material F marks the hollow needle 14 as far as the extremity 22 of this hollow needle 14.

The casing material circulates inside the die 6 between the internal wall 23 of the die 6 and the external wall 24 of the hollow needle 14.

Thermic means 25 are provided to modify the temperature of the casing material and stuffing material circulating in the first section. These thermic means 25 can be a double casing, an electric resistor, an oil bath or other fluids.

For reasons of spatial requirement, the thermic means 25 cannot be placed on a length L4 at the start of the die 6.

On the length L1, the casing of the product is formed by solidifying, as shall be described subsequently in detail.

The temperature provided by the thermic means 25 is T1 and the outgoing temperature of these thermic means is T'1.

Following the first section L1, the die 6 has the second section with a length L2 which does not include the hollow needle 14. This section L2 includes second thermic means 26 similar to the first thermic means 25.

According to one variant, L1=150 cm and L=400 cm. According to another variant, L1=30 cm and L=250 cm.

The temperature supplied by these thermic means 26 is T2, the outgoing temperature of these thermic means 26 being T'2. The second section L2 includes a section S'3 between the thermic means 25 and the thermic means 26. The first section S1 includes a section S'3 with a length L'3 between the coextrusion head 11 and the thermic means 25.

Table 1 shows a precise embodiment example of the method of the invention according to two possible embodiments.

Throughout the following description reference will be made to Table 1. Table 1 represents the operating temperatures at various areas of the coextrusion device of the invention according to a hot coextrusion type embodiment and according to two cold coextrusion type embodiments.

Table 1 shows:
- the temperature Tf of the stuffing in the feed hopper 8, the inlet temperature T3 and outlet temperature T'3 of the thermic means 19, the temperature t3 of the stuffing material leaving this zone and arriving at the hollow needle 14, the temperature TE of the casing material in the feed hopper 7, the inlet temperature T4 and outlet temperature T'4 of the regulation means 18, and the temperature t4 of the casing material at the outlet of the regulation means 18 and arriving at the coextrusion chamber 12;
- the inlet temperature T1 and outlet temperature T'1 of the first thermic means 25 and the average temperature TP1 of the product immediately at the outlet of the hollow needle 14;
- the inlet temperature T2 and outlet temperature T'2 of the second thermic regulation means 26 and the temperature TP2 of the product in the section L2.

The casing material and the stuffing material need to be able to be transferred and pumped into the coextrusion system. They can be introduced into the feed hopper therefore in a fluid to viscous form, viscosity needing to be less than values which would block the device, for example about between 50,000 and 100,000 centipoises, indeed even 1,000,000 centipoises, with a pumping pressure able to reach between 20 and 50 bars.

According to a first embodiment, the coextrusion system is a hot coextrusion system. According to a second embodiment, the coextrusion method is a cold coextrusion method.

As regards the casing material, hot coextrusion is used more particularly for molten cheese specialities and molten cheeses, as well as non-molten cheese specialities and natural cheeses.

The temperature TE of the initial casing material is about 90° C. This material is cooled at the level of the transfer means 9 and then successively at the die outlet, in the first section S1 and then in the second section S2.

This casing material is therefore non-thermocoagulable but thermoliquefying.

Cold coextrusion is used more particularly for composite food materials, such as meat, butcher, fish, surimi, for example.

The cold casing material at the level of the hopper 7 is kept cold in the transfer means 9 and then reheated in the section L1 of the die.

This material is for the most part thermocoagulable, such as meat, eggs, cheese lactose, fish flesh and surimi preparations.

In hot coextrusion as in cold coextrusion, the formation of the casing and stuffing is effected continuously but time shifted: forming of the casing in the section S1 and then formation of the stuffing in the section S2.

The diameter d of the hollow needle 14 is for example equal to 12 mm and the die 6 has a diameter D=18 mm.

In hot coextrusion as in cold coextrusion, the composition of the products 5 can use other secondary ingredients and additives for improving flavour of the finished product, its machinability, its preservation and in particular its external aspect.

These secondary ingredients can be food hydrocolloids (starch, modified starch, gelatines, gums, carrageens), animal or vegetable proteins (wheat, soya proteins, egg, whey proteins), preservatives (sorbic acids, sorbtates, nisin, nitrites, etc), aromas and spices, animal or vegetable fat (butter, cream, MGLA, rape oil, sunseed oil, cocoa-nut butter), varied salts (fine salt, polyphosphates, calcium chlorides), colouring agents (cochineal carmine, methyl yellow, paprika) sugared preparations ( milk preserve, fruit preserve, crystallized fruit, dried fruit, chestnut cream, chocolate, caramel, nougat, dried and sugared cereals), fruit or vegetable extracts as well as dried grains.

The geometry of the die system 6 and the hollow needle 14 may be extremely variable.

Figure 2:
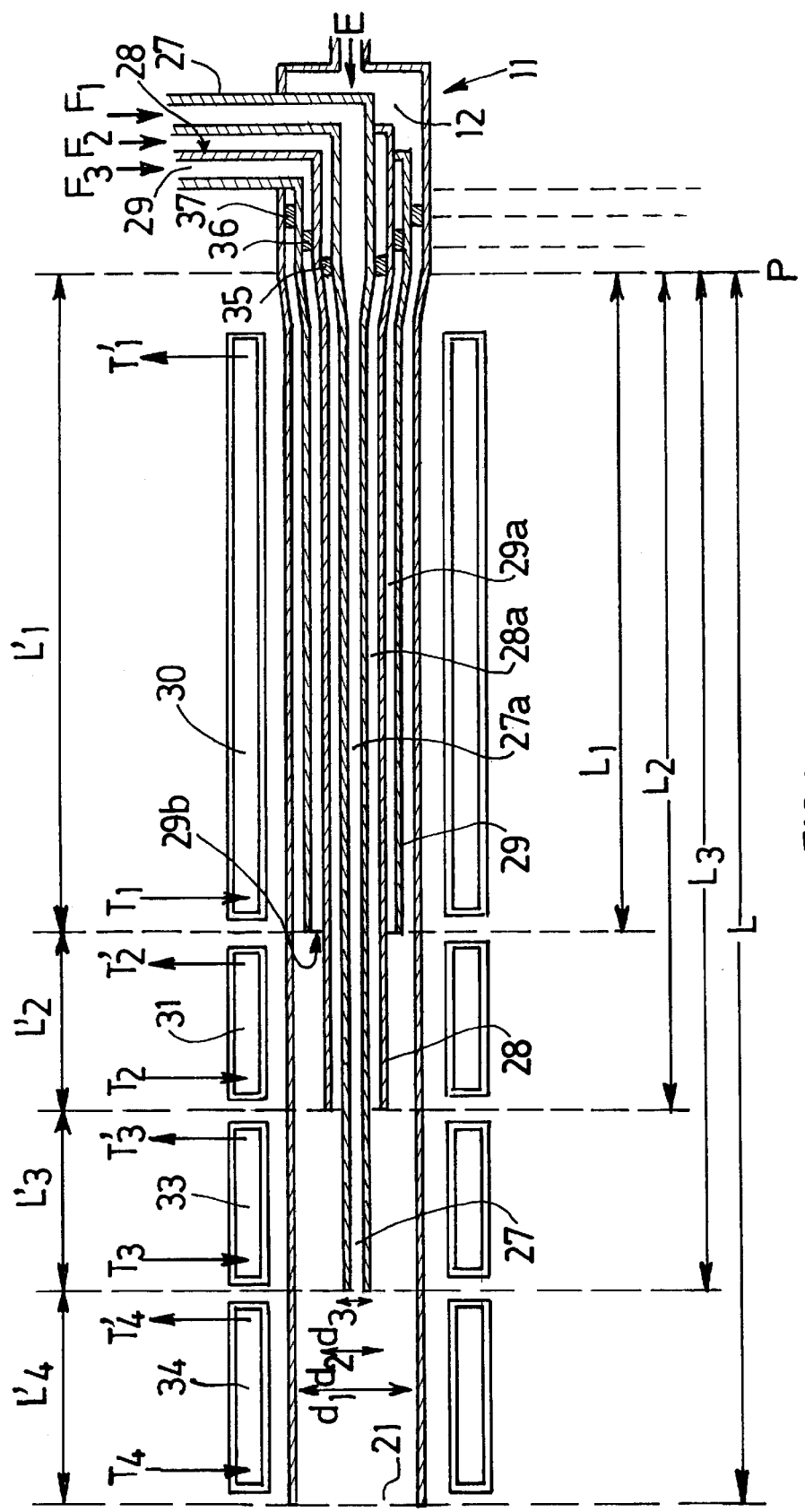
FIG. 2 is a partial diagrammatic view on larger scale of the die of a coextrusion device according to another embodiment of the invention, the die including three stuffing hollow needles.

According to one embodiment, the coextruder includes a die 6 common to several hollow needles 14 (FIG. 2).

The coextrusion system includes:
- a central hollow needle 27 extending over a length L3 and including a device 35 for fixing and centring this hollow needle 27;
- a hollow needle 28 surrounding the hollow needle 27 over a length L2 smaller than L3 and including a device 36 for fixing and centring this hollow needle 28;
- a hollow needle 29 surrounding the hollow needles 27 and 28 over a length L1 smaller than L2 and including a device 37 for fixing and centring this hollow needle 29. The hollow needle 29 is the shortest of the three and its extremity 29b defines the end of the first section S1.

Thermic means 30 provide a temperature T1 on a length L'1 (approximately equal to L1), thermic means 31 provide a temperature T2 on a length L'2 (approximately equal to L2−L1), thermic means 33 provide a temperature T3 on a length L'3 (approximately equal to L3−L2) and thermic means 34 provide a temperature T4 on a length L'4.

The thickness of the walls of the hollow needles is for example about 1.5 mm. The length of the total die is L. According to one variant, L1=30 cm, L2=L3=40 cm, L=140 cm, and according to another variant L1=100 cm, L2=L3= 110 cm, L=310 cm. The diameters for the sections L1, L2, L3 are for example: d1=17 mm, d2=12 mm, d3=6 mm.

The hollow needles 27, 28, 29 are concentric and respectively include a first stuffing 27a, a second stuffing 28a, a third stuffing 29a, the stuffing 29a being at the periphery.

The coextrusion system may further include a distribution plate associated with the centring devices 35, 36, 37.

The cross section of The product obtained has the shape shown on FIG. 6f.

On the basis of the previously described embodiments with one hollow needle and three hollow needles, using the coextrusion system makes it possible to have a large number of geometries in order to give the finished product its shape.

The main constraints concern the machining of parts, especially if they are metallic. However, it is possible to use composite materials much easier to machine or weld, such as polymers or plastic resins so as to form the hollow needles on elements of the body of the coextrusion head (distribution plate for example).

Generally speaking, the dies and hollow needles have the same geometry concerning their length, but in certain embodiment variants, it is possible to profile them. The downward portion of the die or hollow needle is then wider than the upstream portion. This configuration makes it possible to increase the coextrusion effect at the outlet of the hollow needle or die. This reduction of the internal diameter of the die or hollow needle provokes an increase of the pressure of the moving food mass and thus often an acceleration of the material flows at the outlet.

The devices for fixing and centring the hollow needle, such as the devices 35, 36, 36 of each hollow needle 27, 28, 29 are mounted on a metal joint making it possible to centre or move out of centre the hollow needle(s) and thus obtain original shapes, especially ludic. A distribution plate is positioned at the level of the joints so as to regularise the flow of the food materials constituting the casing and the stuffings from a level n+1. The product circulating in the central hollow needles does not pass through this plate.

FIG. 3 shows several embodiment variants illustrating products having extremely different shapes according to the hollow needle(s) used.

FIG. 3 diagrammatically represents a general shape of the coextruded product when round (3a), square (3b), triangle (3c), tile shape (3d) or heart (3e), rectangle (3f), oval (3g), rounded triangle (3h), orthogonal (3i), pliers (3j), nugget (3k), pyramid (3l), tunnel (3m), tree (3n), flower (3o).

FIGS. 4 to 4f represent for some of these shapes the coextruded product including the external casing and the internal stuffing. For example, for FIG. 4c, the section of the die is square and that of the internal hollow needle is circular.

FIGS. 5a, 5b and 5c represent products obtained from various hollow needle/die ratios. The ratio of the diameter of the hollow needle to the diameter of the die is clearly higher for FIG. 5a.

FIGS. 6a to 6g represent products obtained from a die common to several hollow needles. The stuffings are separate from one another in FIGS. 6a to 6d and merge for FIG. 6e. A ludic shape is obtained on FIG. 6d representing a face.

FIGS. 7a and 7b represent products obtained using an offset hollow needle and FIG. 7c represents a product obtained using a an eclipse offset hollow needle.

Figure 9:
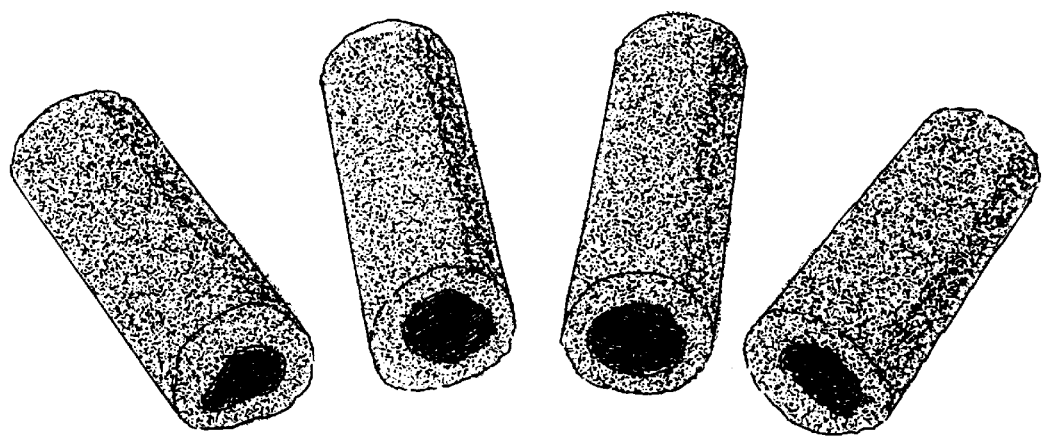
FIG. 9 represents several non-restrictive embodiment variants of food products conforming to the invention, the food products being log-shaped.

At the die outlet, slicing at various lengths and other mechanical treatments can give extremely different shapes to the product. For example, FIG. 8a illustrates pastries, FIGS. 8b and 9 represent a log-shaped product, FIGS. 8c, 8d represent closed pliers-shaped products and FIG. 8e represents a ball-shaped product.

By using the method described, it is possible to obtain all these product shapes for small products with a diameter in particular of smaller than 20 mm. The method also makes it possible to produce products with a larger diameter of for example between 50 and 100 mm. The dimensions of the product are determined by the dimensions of the die and the hollow needle(s)..

In the methods of the prior ant which do not use any long hollow needle inside the die, the production of products with a diameter of less than about 20 mm renders the mounting and dismantling of the coextrusion system more complex, thus resulting in higher production costs.

There follows below a specific description of the composition of the casing material and stuffing material.

According to one embodiment, the composition of the coextruded product is similar to that of the cheese specialities described in the document EP A 260 194.

The casing material is obtained from refined basic cheeses F1 having at least 50% of dry matter and more specifically from pressed paste cheeses, possibly cooked, molten cheeses being excluded.

The percentage of dry fat is for example about or more than 25%. This type of cheese is not subject to syneresis. The best results are particularly obtained from Dutch cheeses (Gouda, Edam, Mimolette, Leerdarmeur), or pressed paste cheeses (Saint-Paulin, Emmenthal, Comté, Cheddar).

Added to this basic cheese F1 to be processed are specific proteins, in particular whey. These proteins are added when this cheese is at a temperature of between 40° C. and 80° C.

The cheese designated F2 thus obtained (directly or indirectly ) by being added to the basic cheese F1 used with proteins, in particular whey, before bringing the cheese to a temperature of about 80° C., provides said cheese with machinability enabling it to be subsequently mechanically processed, especially for the coextrusion method of the invention.

The stuffing materials can be used in a large number of embodiment variants depending on the final food product desired to be obtained. This may involve a product basically containing cheese, or delicatessen, or pastry or confectionery products. The stuffing may be homogeneous, more or less solid or soft, indeed, liquid. The stuffing may be heterogeneous and comprise pieces of food such as fruit, seafood, vegetables, ham, mushrooms, and especially cheese.

For example, the cheese used for the casing is a newly-produced Gouda with a 59% dry extract and a percentage of 51.5% dry fat. The cheese is cut into small pieces. Whey proteins apportioned at 10% in weight are added to the cheese and the whole composition is mixed together and brought to a temperature of 8° C. by heating for 13 minutes so as to form a homogeneous mass. This mass is introduced in the first feed hopper 7 of the coextrusion device 1. The stuffing is made of fresh double cream cheese with a 44% dry extract and a percentage of 70% dry fat. The stuffing is introduced at about 73° C. into a second hopper 8 of the machine. Passage in the machine makes it possible to obtain a product comprising up to 65% of filling weight (corresponding to the general shape of FIG. 2).

There now follows a description of some examples of manufactured formulations. The following examples 1, 2, 3, 5 are obtained by means of a hot coextrusion system. Examples 4, 6 and those following are obtained with a cold coextrusion system.

EXAMPLE 1

Coextruded cheese (casing)+fruit preparation (stuffing). A casing made up of 53% dry extract molten cheese and 53% dry extract fat is prepared by mixing at 90° C. in a dough mixer from newly-produced cheddar, buter, water, starch, melting salts, gelatine, carrageenan and aromas. A fruit stuffing is prepared via mixing at 70° C. a strawberry preserve with portions, water, starch, gelatine, saccharose, fructose and aromas. The water content and activity of the water of the stuffing are adjusted so as to be compatible with the content and activity of the molten cheese.

EXAMPLE 2

Co-extruded Cheese Speciality (Casing)+Natural Cheese (Stuffing)+Fruit Filling (Stuffing)

Here, the casing is made up of a mixture at 45° C. into a dough mixer of Edam, lactic cottage cheese, gelatine (excluding melting salts). The first stuffing is made up of a double cream lactic cottage cheese with a 45% dry extract and 72° C. dry extract fat. It is prepared cold by mixing. The second stuffing is prepared from frozen fruit pulp to which sugar, starch, a red colouring agent, an aroma and food hydrocolloids are added. The water content and activity of the water of the two stuffings are adjusted so as to be compatible with those of the molten cheese.

EXAMPLE 3

Co-extruded Natural Cheese+Preparation with Green Vegetables

The casing is made up of a newly-produced Gouda natural type cheese. A vegetable stuffing is prepared from a mash of fresh vegetables to which added are starch, vegetable fibres, potato starch salt, glucitol, a colouring agent and a specific aroma. The water content and activity of the water of the stuffing are adjusted so as to be compatible with those of the natural cheese.

EXAMPLE 4

Coextruded "Surimi"+Salmon Mousse

A "surimi" casing is prepared cold in a cutter made from fish "surimi", fish pulp, shellfish extract, water, liquid egg white, potato starch, wheat starch and aroma oil. The stuffing is a salmon mousse prepared with a cutter, also cold, from a salmon fillet, oil white fish pulp, potato starch paste, fresh cream, liquid egg white, salt, aroma and a colouring agent.

EXAMPLE 5

Co-extruded Baker's Bough+Molten Cheese

The casing is made up of a type of cabbage baker paste prepared with a baker dough mixer. The stuffing is a molten cheese as described in example 1 but whose water content and water activity have been modified so as to be compatible with those of the baker paste after cooking. The whole preparation is baked at a temperature of 240° C. in the oven after coextrusion.

EXAMPLE 6

Coextruded Baker Paste+Meat Preparation

The casing is constituted of a Genoese type baker paste prepared by traditional means. The stuffing is a traditional duck mousse delicatessen except that the water content and water activity of the duck mousse have been modified so as to be compatible with that of the Genoese paste after cooking.

By means of the method of the invention the products obtained can be seized. Contrary to the case with products obtained by methods of the prior art, the product at the die outlet has a "finished" structure. As the product is not being pasty, it does not adhere and is pleasant to the touch, even for small pieces such as sticks.

Previously described was an embodiment using one hollow needle and another embodiment using three hollow needles. There now follows a description of certain principles to be used so as to define the main parameters of the coextrusion system, especially the lengths of the dies and the hollow needles.

The system clearly differs from the prior art for a length $L1$ of the shortest hollow needle by at least 10 cm, $L1$ being the length of the most peripheral hollow needle as regards the concentric hollow needles inside the coextrusion die.

In current practice, said length $L1$ is more frequently between 30 to 150 cm long, which makes it possible to optimally form the external casing.

If $L2, L3, \ldots Ln$ correspond to the length of additional hollow needles in the case of multiple co-extrusion, $L2, L3, \ldots$ or $Ln$ can be equal to $L1$, but more frequently, $L2=L1+x$ cm, $L3=L2+x$ cm, $\ldots$, $L(n-1)$ with x being between 0 and 30 cm.

The length L of the die is still greater than the length of the most peripheral hollow needle ($L1, L2, L3, \ldots Ln$ depending on the case). The difference $L-Ln$ is at least equal to 10 cm, but in the most frequent cases at least 30 to 600 cm. This length on which a significant thermic exchange is carried out is required to thoroughly cool or heat the various co-extruded elements.

For example, the following is obtained:
for a die with one hollow needle (previously described)
$L1=150$ cm with $L=400$ cm
$L1=30$ cm with $L=250$ cm
for a die with three stuffings (previously described):
$L1=30$ cm, $L2=L3=40$ cm and $L=140$ cm
$L1=100$ cm, $L2=L3=110$ cm and $L=310$ cm
for a die with two stuffings:
$L1=30$ cm; $L2=60$ cm and $L=4$ m
$L1=10$ cm; $L2=20$ cm and $L=80$ cm The following defines the temperatures of the system:
TE=the temperature of the casing in the feed hopper of the system
TFn=the stuffing temperature n in its feed hopper
TFIL 1=the average temperature of the wall of the die corresponding to the length L1
TFIL n=the average temperature of the wall of the die corresponding to the length Ln–(Ln−1)
TP1=the average temperature of the product at the outlet of the hollow needle 1
TPn=the average temperature of the product at the outlet of the hollow needle n
TFILFIN=the average temperature of the wall of the die corresponding to the length L–Ln
TPFIN=the average temperature of the product at the outlet of the die.

On the basis of these definitions, several temperature profile configurations are possible depending on whether or not:
the product is thermocoagulable;
the product comes from a hot or cold manufacturing process;
the need to keep hygienic protective measures during the entire manufacturing product, including co-extrusion.

In the embodiments using cheeses or cheese specialities or molten cheeses or molten cheese specialities as casing materials, it is possible to work "all cold" in refrigerated mode, but most frequently a "hot" process, indeed at "at high temperature" is preferable.

For said "all cold" process with respect to the "Rheon" or "VEMAG" machines, the formation independently of the casing makes it possible to obtain a firmer, softer and more homogeneous texture of the external casing.

In this case, TE=TFn=TFIL 1=TFILn=TFLFIN=TP1=TPn=TPFIN=2–10° C. A refrigerating system makes it possible to guarantee obtaining these temperatures.

For said "hot" process, the casing and the stuffing(s) are introduced into the equipment at a temperature of between 30 and 80° C. These temperatures make it possible to obtain optimum fluidity of the food mixtures. The control zones situated along the die make it possible to control the flow of solidification of the finished product.

In this case, TE=TFn=30–80° C.; 80° C.>TFIL1>TFILn>TFILFIN=30° C.; TP1=TPn=TPFIN=70 to 35° C.

For said "high temperature" process, the process is parametered so as to guarantee a high standard of hygiene. In general, the casing and the stuffing(s) are subjected to a temperature of between 90 and 100° C. In the ultimate case of a UHT molten cheese for example, the feed hopper can be brought to temperatures greater than 100° C.

In this case, TE=TFn=90–100° C.; 80° C.>TFIL 1>TFILn>TFILFIN=30° C.; TPI=TPn=TPFIN=85 to 35° C.

In the embodiments using "surimi" based casings or meat preparations, it mainly involves thermocoagulable systems and is thus advisable to preferably feed the whole system at a relatively low temperature of between 2 and 50° C. and preferably less than 15° C. Therefore, the temperatures are TE=TFn=2–50° C.; TFIL1=TFILn=TFILFIN>80–100° C.; TP 1=TPn=TPFIN=60–80° C. thoroughly hot. In the latter case, temperatures higher than 100° C. can be reached by using a double casing inside which oil or any other glycol type fluid circulate.

Pre-cooling or pre-heating of the casing or stuffings before reaching the coextrusion head is carried out when the temperature differences are too significant. In this case, the temperatures are brought into more compatible ranges for the solidification process in the die.

In the above description, it is understood that a large number of diverse products may be obtained with a typically high continuous flowrate whereas in the prior art these flowrates able to reach 10/metres/minute were difficult to reach for small pieces. Moreover, downstream of the die, as the coextruded product is not sticky, it can be easily sliced. For example, it is possible to use a rotary blade system, cutting with wire, a jet nozzle and ultrasonic devices.

Table 1 ferring the stuffing food material, one hollow needle per stuffing food material, and penetrating a second section of the die, the beginning of the second section being defined by the outgoing extremity of a shortest hollow needle;

stuffing in a second section of the die the solid casing formed in the first portion of the die with the stuffing food material coming out of the at least one hollow needle traversing the first section; and recovering the product comprising the external casing filled with the stuffing food material at an outlet of the die.

2. The method according to claim 1, wherein the casing is formed in the first section of the die by cooling via circulation of a fluid.

3. The method according to claim 2, wherein the casing is selected from a group comprising at least one of natural cheeses, fresh cottage cheeses, non-molten cheese, and combinations thereof.

4. The method according to claim 2, wherein the casing is selected from a group comprising at least one of molten cheeses, molten cheese specialties with a melting salt or cheese specialties without the melting salt, and combinations thereof.

5. The method according to claim 2, further comprises the following stages:

preparing the stuffing food material and casing material at temperature close to 90° C. in feed hoppers;

cooling of the stuffing food material at a temperature of about 80° C. and cooling the casing material at temperature of about 60° C. between the feed hoppers and coextrusion head;

extruding the casing material with cooling of the first section of the die at a temperature of about 50° C. so as to solidify the casing; and extruding the stuffing food material which fills the casing produced in the first section with cooling of the second section of the die at a temperature of about 30° C., the product coming out of the die having a temperature of about 38° C.

6. The method according to claim 3, wherein the temperatures in the coextrusion device follow:

TE=TFn=TFIL1=TFILn=TFLFIN=TP1=TPn=TPFIN=2–10° C.,

TABLE 1

|  | $T_2$ | $T'_2$ | $T_1$ | $T'_1$ | $T_3$ | $T'_3$ | $T_4$ | $T'_4$ | $T_F$ | $T_E$ | $T_P$ |
| --- | --- | --- | --- | --- | --- | --- | --- | --- | --- | --- | --- |
| HOT OPERATION | 25° C. | 28° C. | 45° C. | 49° C. | 78° C. | 80° C. | 55° C. | 60° C. | 90° C. | 90° C. | 30° C. |
| COLD OPERATION 1 | 24° C. | 26° C. | 45° C. | 47° C. | 73° C. | 75° C. | 4° C. | 5° C. | 83° C. | 7° C. | 28° C. |
| COLD OPERATION 2 | 98° C. | 92° C. | 98° C. | 98° C. | 50° C. | 47° C. | 4° C. | 5° C. | 4° C. | 4° C. | 80° C. |

What is claimed is:

1. A method for producing a food product having a solid external casing, the food product including at least one casing material from a food base, for forming the casing of the food product, and at least one stuffing food material, the food product formed in a coextrusion device comprising a coextrusion die fed with the food base and the stuffing food material, the method comprises the following successive steps:

forming in a first section of the die the casing which solidifies by cooling, said first section being traversed longitudinally by at least one hollow needle for transthese temperatures being defined as follows:

TE=the casing temperature in the feed hopper of the system;

TFn=the stuffing temperature n in the feed hopper;

TFIL 1=the average temperature of the wall of the die corresponding to the length L1;

TFILn=the average temperature of the wall of the die corresponding to the length Ln–(Ln–b 1);

TP1=the average temperature of the product at the hollow needle outlet 1;

TPn=the average temperature of the product at the hollow needle outlet n;

TFILFIN=the average temperature of the wall of the die corresponding to the length L–Ln; and TPFIN=the average temperature of the product at the die outlet.

7. The method according to claim 3, wherein the temperatures in the coextrusion device follow:

$$TE=TFn=3–80° C.; 80° C. >TFIL\ 1>TFIL\ n>TFILFIN=30° C.:$$
$$TP1=TPn=TPFIN=70\ to\ 35° C.$$

8. The method according to claim 3, wherein the temperatures in the coextrusion device follow:

$$TE=TFn=90–100° C.; 80° C.>TFIL>TFILn>TFILFIN=30° C.;$$
$$TP1=TPn=TPFIN=85\ to\ 35° C.$$

9. The method according to claim 1, wherein the stuffing is selected from a group comprising at least one of cheese, meat, egg, fish flesh, surimi, fruit, vegetable and composite products.

10. The method according to claim 1, wherein the casing material has a dry extract of at least 30%.

11. The method according to claim 1, further comprising feeding a coextrusion head by two single pumps with supercharging hoppers, respectively for the stuffing material and the casing material.

12. The method according to claim 11, wherein a transfer pump of the hoppers is connected towards a coextrusion head directly on the coextrusion device.

13. The method according to claim 11, wherein the transfer pump is connected to an intermediate closed system fitted with a heat exchanger so as to check the temperature of the materials just before they enter the coextrusion head.

14. The method according to claim 1, wherein a pressure and distribution of a flow of material for forming the casing are regulated by means of a distribution plate inserted on a channel of the casing of the product.

15. The method according to claim 1, wherein the product at the outlet of the die is sliced then packed.

16. The method according to claim 1, wherein a flow linear speed at the outlet of the die is about 5 to 10 metres/minute.

17. The method according to claim 1, further comprising:
assembling a plurality of coextruded segments; and
obtaining a restored block to be sliced by heating.

18. A method for producing a food product, the food product comprising a casing, for coating at least one stuffing food material, the casing including at least one casing material from a food base, the food product being formed in a coextrusion device having a die and a hollow needle, the method comprising:

(a) forming in a first section of the die the casing which solidifies by cooling, the first section being traversed longitudinally by the hollow needle for transferring the stuffing food material;

(b) stuffing in a second section of the die the casing formed in the first section of the die with the stuffing food material coming out of the hollow needle traversing the first section, the beginning of the second section of the die being substantially defined by the extremity of a shortest hollow needle; and (c) recovering the food product comprising the casing filled with the stuffing food material at an outlet of the die.

19. The method according to claim 18, wherein the casing is formed in the first section of the die by cooling via circulation of a fluid.

20. The method of claim 19, further comprising:

(a) preparing the stufing food material and rasing material at a temperature of about 90° C. in feed hoppers;

(b) cooling of the stuffing food material at a temperature of about 80° C. and cooling the casing material at a temperature of about 60° C. between the feed hopper and a coextrusion head;

(c) extruding the casing material while cooling of the first section of the die at a temperature of about 50° C. so as to solidify the casing; and (d) extruding the stuffing food material which fills the casing produced in the first section with cooling of a second section of the die at a temperature of about 30° C., the product coming out of the die having a temperature of about 38° C.

21. The method according to claim 18, wherein the temperatures in the coextrusion device follow the expression:

$$TE=TFn=TFIL1=TFILn=TFLFIN=TP1=TPn=TPFIN=2–10° C.,$$

these temperatures being defined as follows:
TE=the casing temperature in the feed hopper of the system;
TFn=the stuffing temperature n in the feed hopper;
TFIL 1=the average temperature of the wall of the die corresponding to the length L1;
TFIL n=the average temperature of the wall of the die corresponding to the length Ln–(Ln–1);
TP1=the average temperature of the product at the hollow needle outlet 1;
TPn=the average temperature of the product at the hollow needle outlet n;
TFILFIN=the average temperature of the wall of the die corresponding to the length L–Ln; and
TPFIN=the average temperature of the product at the die outlet.

22. The method to claim 21, wherein the temperatures in the coextrusion device follow the expression:

$$TE=TFn=30–80° C.; 80° C.>TFIL\ 1>TFIL\ n>TFILFIN=30° C.:$$
$$TP1=TPn=TPFIN=70\ to\ 35° C.$$

23. The method according to claim 21, wherein the temperatures in the coextrusion device follow the expression:

$$TE=TFn=90–100° C.; 80° C.>TFIL\ 1>TFILFIN=30° C.; TP1=$$
$$TPn=TPFIN=85\ to\ 35° C.$$

24. The method according to claim 18, wherein the coextrusion head is fed by a first pump for the stuffing material and a second pump for the casing material.

25. The method according to claim 24, further comprising:
determining a temperature of the materials before they enter the coextrusion head.

26. A method for producing a food product with a coextrusion device having a die, the method comprising:

(a) forming a casing from a casing material in a first section of the die and solidifying the casing;

(b) transferring a stuffing food material into a second section of the die by a hollow needle;

(c) stuffing the casing in the second section of the die with the stuffing food material transferred by the hollow needle; and (d) creating the product, comprising the casing filled with the stuffing food material, at an outlet of the die.

27. The method of claim 26, wherein forming a casing includes cooling the first section of the die via circulation of a fluid.

28. The method of claim 26, wherein forming a casing includes selecting at least one of a natural cheese, a fresh cottage cheeses, and a non-molten composite cheese.

29. The method of claim 26, further comprising:
   (a) preparing the stuffing food material and casing material at a temperature of about 90° C. in feed hoppers;
   (b) cooling the stuffing food material at temperature of about 80° C. and cooling the casing materail at a temperature of about 60° C.;
   (c) extruding the casing material while cooling the first section of the die at a temperature of about 50° C.; and
   (d) extruding the stuffing food material, which fills the casing produced in the first section while cooling the second section of the die at a temperature of about 30° C.

30. The method of claim 26, wherein the temperatures in the coextrusion device include:

$$TE=TFn=TFIL1=TFILn=TFLFIN=TP1=TPn=TPFIN=2-10° C.,$$

these temperatures being defined as follows:

TE=the casing temperature in the feed hopper of the system;
   TFn=the stuffing temperature n in the feed hopper;
   TFIL 1=the average temperature of the wall of the die corresponding to the length L1;
   TFIL n=the average temperature of the wall of the die corresponding to the length Ln–(Ln−1);
   TP1=the average temperature of the product at the hollow needle outlet 1;
   TPn=the average temperature of the product at the hollow needle outlet n;
   TFILFIN=the average temperature of the wall of the die corresponding to the length L–Ln; and
   TPFIN=the average temperature of the product at the die outlet.

31. The method of claim 26, wherein the temperatures in the coextrusion device include:

$$TE=TFn=30-100° C.; 80° C.>TFIL>TFILn>TFILFIN=30° C.;$$
$$TP1=TPn=TPFIN=70 \text{ to } 35° C.$$

32. The method of claim 26, further comprising: selecting the stuffing food material from a group including at least one of a cheese, a meat, an egg, a fish flesh, a surimi, a fruit, a vegetable composite, and combinations thereof.

33. The method of claim 26, wherein the casing includes at least 30% dry extract.

34. The method of claim 26, further comprising:
   feeding a coextrusion head by two pumps each associated with a hopper.

35. The method of claim 34, further comprising:
   (a) pumping the casing material with a first of said two pumps to a coextrusion head;
   (b) pumping the stuffing food material with a second of said two pumps to said coextrusion head;
   (c) filling said casing, including:
      (i) flowing said casing around a hollow needle; and
      (ii) pumping said stuffing food material through said hollow needle and into said flowing casing.

* * * * *